(No Model.) 2 Sheets—Sheet 1.
C. VON RIESEN.
BAND CUTTER AND FEEDER.
No. 522,230. Patented July 3, 1894.
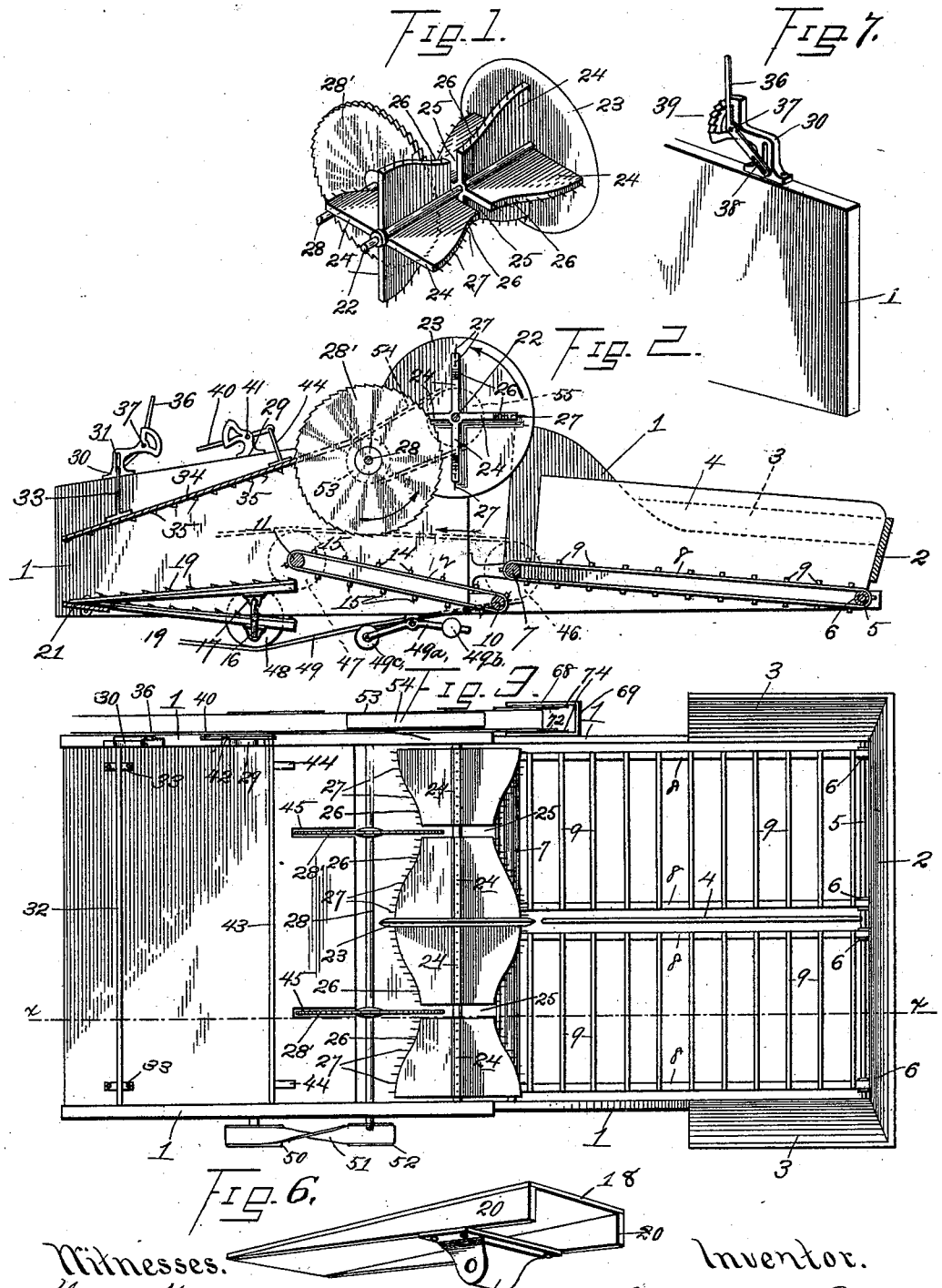
Witnesses.
John Zimmermann.
M. H. Barringer.
Inventor.
Cornelius von Riesen.
By Higson & Higson
Attys.

(No Model.) 2 Sheets—Sheet 2.
C. VON RIESEN.
BAND CUTTER AND FEEDER.
No. 522,230. Patented July 3, 1894.
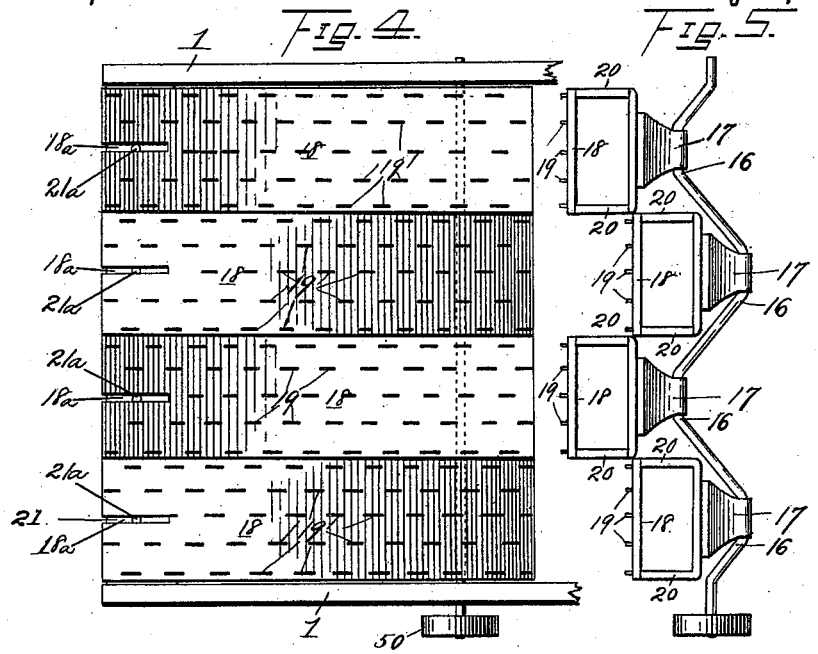

UNITED STATES PATENT OFFICE.

CORNELIUS VON RIESEN, OF BEATRICE, NEBRASKA.

BAND-CUTTER AND FEEDER.

SPECIFICATION forming part of Letters Patent No. 522,230, dated July 3, 1894.

Application filed October 23, 1893. Serial No. 488,859. (No model.)

*To all whom it may concern:*

Be it known that I, CORNELIUS VON RIESEN, of Beatrice, Gage county, Nebraska, have invented certain new and useful Improvements in Band-Cutters and Feeders, of which the following is a full, clear, and exact description, reference being had to the accompanying drawings, forming a part hereof.

This invention relates to band cutters and feeders for thrashing machines, and the objects of my invention are to produce a simple, durable and effective mechanism whereby the speed of the elevator or conveyer is controlled, which guides the bundles and thereby insures the cutting of the bands no matter whether the bundle be compact or loose, which thoroughly shakes the straw, and which is adjustable to regulate the quantity of straw fed to the cylinder.

The invention consists in its peculiar and novel construction and combinations of parts, as hereinafter described and claimed, and illustrated in the accompanying drawings, in which—

Figure 1, represents a detail perspective view of one of the beaters, and one of the band cutters. Fig. 2, is a vertical longitudinal sectional view taken on the line $x$—$x$ of Fig. 3. Fig. 3, is a top plan view of a feeder and band cutter constructed in accordance with my invention. Fig. 4, represents a top plan view of a portion of the discharge end of the feeder frame, and showing the reciprocatory rakes or feed tables. Fig. 5, is an end view of the shaking rakes or feed table, and showing also the crank shaft by which they are carried. Fig. 6, is a detail perspective view of one of the rakes or feed tables. Fig. 7, is a detail perspective view of the mechanism for raising or lowering one end of the board which is adjustable to control the amount of the straw fed to the cylinder.

In the said drawings, the feeder frame is composed of the sides 1, the cross-bar 2 connecting said sides at their forward or outer ends, and inclining upwardly and outwardly preferably, as shown, and the inclined guide boards 3—3 which extending longitudinally of the upper margin of the sides for a suitable distance at their outer ends, diverge upwardly and outwardly for a purpose hereinafter explained. The sides 1 at their discharge ends are adapted to be connected to the thrasher in the usual or any preferred manner, and the outer end of this feeder frame is also adapted to be supported in any suitable or preferred manner. A vertical partition or guide board 4, is located centrally of the feeder and extends inwardly from the end board 2 for a suitable distance; this board is adapted to be removed when loose grain is to be thrashed.

Extending transversely of the rear frame adjacent to the lower end of the end board 2 is a shaft 5, and this shaft is provided adjacent to each side of the partition 4 with a pulley 6, and near each end a slight distance inward of the side 1, with similar pulleys 6.

Extending transversely of the machine and parallel with the roller, but preferably arranged in a higher horizontal plane than said roller, is a roller 7, and this roller 7 is connected to the shaft 5 by means of the endless belts 8; a pair of these belts being located at each side of the partition 4, and these belts are connected by the cross strips or slats 9.

Arranged slightly inward of and below the inner roller 7 is the transversely extending shaft 10, and extending also transversely of the frame-work a suitable distance inward of and in a higher horizontal plane than said shaft 10 is a similar shaft 11, and this shaft 11 is connected to the shaft 10 by an endless apron or belt 12, provided with cross strips 14 having outwardly projecting teeth or fingers 15.

Extending transversely of the framework a suitable distance inward of the shaft 11, and journaled to the lower edges of the sides 1 in any suitable manner, is a shaft provided in this instance with four crank sections 16 projecting alternately in opposite directions, and pivotally connected to each crank section is a bearing bracket 17 which is secured to the lower margins of the reciprocatory feed-tables or shaking rakes; said tables or rakes consisting each of a top-board 18 provided with upwardly projecting teeth 19, the disposition of which is toward the discharge end of the feeder, and the depending side boards 20, to the lower margins of which the bearings 17 are secured. The front ends of these rakes rest loosely upon a cross-plate or board 21 which unites the sides 1 near their discharge ends, and this plate or board is preferably inclined downwardly and outwardly to correspond with the inclination of the rakes or feed-tables when in their lowest position. To guide the rakes or tables in their longitudinal movement pins 21ª projecting up from the cross plate 21 engage longitudinal recesses or slots 18ª in the said rakes or feed tables.

Extending transversely of and journaled at its opposite ends in the sides of the feeder frame near their upper margin and a slight distance inward of the discharge end of the elevator or conveyer is the horizontal shaft 22, and mounted rigidly upon said shaft or cast integrally therewith if desired, is a beater, the construction of which I will now proceed to describe. This beater or double beater consists of a disk 23 centrally located upon the shaft 22 so as to be opposite and adjacent to the inner end of the partition 4 and in longitudinal alignment therewith.

Extending radially outward from the shaft 22 and preferably at right angles to each other are the four beater arms 24, said arms extending from each side of the disk 23 to a point adjacent to the sides 1 of the framework, and these radial arms 24 are recessed or concaved in their outer margin in such manner that the central portion of said concaved surface will be opposite the longitudinal center of the space formed upon each side of the partition 4. These radial arms 24 are also notched or recessed in their central points as shown at 25, for a purpose presently explained, thus forming, practically, each beater at opposite sides of the partition-disk 23, into two sections which are separated by the recesses or spaces 25, and the outer margins of which converge inwardly and terminate at said recesses as shown at 26. Projecting outwardly from the outer margins of this beater or double beater, are the gathering teeth or fingers 27.

Arranged in a horizontal plane a suitable distance below and inward of the shaft 22, is a transverse shaft 28 which is also journaled in the sides 1 of the feeder frame, and mounted rigidly upon said shaft is a pair of circular saws 28′ which is arranged opposite and enter the recesses or notches 25 formed in the beater for this purpose.

Secured upon the upper edge of one of the sides 1, is a pair of castings or brackets 29 and 30, the bracket or casting 30 being arranged a suitable distance inward of the bracket or casting 29, and provided with a vertical slot 31 in which engages one end of a rod or bar 32; said rod or bar being provided with pendent arms 33 which are secured in any suitable manner to the upper side of a check or feed regulator board 34. This feed regulator board is of such size as to fit snugly between the sides 1, and to extend from the discharge end of the framework to within a slight distance of the shaft carrying band saws 28′. This board is provided with teeth or projections 35 on its under side whose disposition is away from the discharge end of the feeder, or opposite to the disposition of the teeth of the rakes or feed tables. A spring lever 36 is pivotally mounted at 37 to a segmental extension of the bracket or casting 30, and is provided with a longitudinally extending slot 38 which is engaged by the end of the cross rod or bar 32 which projects through the slot 31. The segmental portion of said bracket or casting is provided with teeth 39, with one or the other of which the lever 36 is adapted to engage, for a purpose hereinafter explained.

A spring-metal lever 40 is pivotally mounted at 41 to the bracket 29, and is also adapted to engage with one or the other of the teeth 42 formed upon the outer side of a segmental extension of said bracket. This lever is also pivotally connected to one end of a cross rod 43 which is provided with depending arms 44 secured to the upper side of the check or feed regulator board 34 adjacent to its outer end. In order that this feed regulator board may fit closely to the band saw shaft, it is notched or recessed at 45 to receive the band saws. By thus arranging the check or feed regulator board adjacent to the band-saw shaft, and also by notching or recessing it to embrace closely the sides of said saws, it will be seen that it will be impossible for any but a very small quantity of the straw to ride upon the saw and become entangled on the said shaft because the margins of said notches lie adjacent to the sides of the saws, and by resisting the upward passage of the straw upon said saws, perform the function of a scraper for the saws, by removing the straw therefrom. It will be seen also that this tendency of the straw to rise and become entangled or wound upon said shaft is also resisted by the beater.

Mounted upon the corresponding ends of the shafts 7 and 11 and to the crank shaft are the pulleys 46, 47 and 48 respectively, and these pulleys are connected by an endless belt 49, which leads to the cylinder pulley not shown. A belt tightener consists of a pivotal lever 49ª, a weight 49ᵇ, at one end, and a pulley 49ᶜ, at the opposite end of said lever; the weight automatically holding the belt 49 taut at all times, by forcing the pulley 49ᶜ against the under side of said belt. Mounted upon the opposite end of the crank shaft is a pulley 50, and this pulley is connected through the medium of a cross belt 51 with a pulley 52 mounted upon the corresponding end of the band-saw shaft. Mounted upon the opposite end of the band cutting shaft is a pulley 53 and this pulley is connected through the medium of an endless belt 54 to the pulley 55 mounted upon the corresponding end of the beater shaft 22.

The general operation of the machine is as follows: The bundle is tossed from the stack upon the outer end of the elevator, the inclined end board 2, and sides tending to direct the bundles upon said elevator. By providing the partition or divider 4, it is impossible for the bundles to fall crosswise upon the elevator. This partition or divider therefore insures the longitudinal position of the bundles upon the elevators. The bundles are now carried in this position to the beater, which by reason of the converging edges 26, of each wing or board, tends to draw the bundle directly in line with the recesses 25, and force it while in this position with the assistance of the toothed elevator under the revolving band-saw, thus making it impossible for a bundle to pass the saw with its band uncut. By reason of this concavity in the edges of the wings or boards of the beater, the loose straw, which tends to escape from the bundle and wind upon the band-saw shaft, is held down until the elevator or conveyer provided with the teeth has control of the bundle, and carrying it to the rear deposits it upon the shaking rakes or feed-tables. The teeth or fingers 27 projecting from the edges of the wings or boards, also tend to gather any disarranged straw, so that the loose straw in the bundle shall pass beneath the beater straight and smooth. The feed-tables or rakes by reason of the reciprocating or shaking motion caused by the crank-shaft, thoroughly spread or evenly distribute the grain and feed it in this position to the thrasher cylinder. Should the cylinder be fed beyond its capacity and the straw begin to roll or bunch in front of the same, it is only necessary to operate the lever 36, and the lever 41 also, if necessary, so as to lower the check or feed-regulator board and thus narrow the passage between the same and the rakes or feed-tables, so that the teeth 35 thereof engaging the straw will prevent its rolling tendency and by so doing will allow only the proper quantity of straw to pass to the cylinder, and thereby obviate the racking of the machine which attends an uneven and heavy feed. This check or feed regulator board is especially useful in handling wet or damp grain. When the grain is dry the check or regulator board may be raised up entirely out of the way if desired, and in this position will be useful as a cover to prevent the dust and chaff flying which tends to injuriously affect the health of a thrashing machine attendant.

From the above description, it will be seen that I have produced a band cutter and feeder, which is positive and reliable in operation, simple, durable and inexpensive of construction, and wherein the speed of the elevator may be changed without interfering with the operation of the machine.

Having thus described my invention, what I claim as new, and desire to secure by Letters Patent, is—

1. In a band cutter and feeder, the combination with a suitable framework, and an elevator carried thereby, of a revoluble beater, consisting of radial wings having concaved edges to guide and concentrate the bundle, and revoluble band saws located inward of the beater, and opposite the center of the concaved portions of the wings, substantially as set forth.

2. In a band cutter and feeder, the combination with a suitable framework, and a series of reciprocatory feed-tables or rakes having forwardly disposed teeth, of a check or feed-regulator board having depending teeth which are above and oppositely disposed to the teeth of the feed-tables or rakes, transverse bars, arms depending therefrom and secured to the check or feed-regulator board, a casting carried by the framework and provided with a vertical slot in which one end of one of the transverse rods engages, a lever pivotally carried by said casting, and having a slot engaged by the end of said transverse rod, a second casting mounted upon the framework, a lever carried thereby, and pivotally connected to the end of the other transverse bar, and means to secure said levers at any point in their adjustment, substantially as set forth.

3. In a band cutter and feeder, the combination with a suitable framework, and a check or feed-regulator board, having teeth at its underside, of a pair of transverse bars, arms depending therefrom and secured to the check or feed-regulator board, a casting carried by the framework and provided with a vertical slot in which one end of one of the transverse rods engages, a lever pivotally carried by said casting, and having a slot engaged by the end of said transverse rod, a second casting mounted upon the framework, a lever carried thereby, and pivotally connected to the end of the other transverse bar, and means to secure said levers at any point in their adjustment, substantially as set forth.

4. In a band cutter and feeder, the combination with a suitable framework, and an elevator carried thereby, of a revoluble beater, consisting of radial wings having concaved edges to guide and concentrate the bundle, and notched or recessed at the center of said concavities, and revoluble band-saws located inward of the beater and working in said notches or recesses, substantially as set forth.

In testimony whereof I affix my signature in presence of two witnesses.

CORNELIUS VON RIESEN.

Witnesses:
M. H. BARRINGER,
JOHN ZIMMERMANN.